United States Patent [19]

Breslin et al.

[11] Patent Number: 5,516,541

[45] Date of Patent: May 14, 1996

[54] NO DRY COATING PROCESS FOR SUGAR COATED FOOD PRODUCTS

[75] Inventors: James C. Breslin, Bellevue; Alicia A. Perdon, Battle Creek; James B. Holder, Battle Creek; Stephen J. Kalchik, Battle Creek; Jerald L. Longman, Climax, all of Mich.

[73] Assignee: Kellogg Company, Battle Creek, Mich.

[21] Appl. No.: 222,704

[22] Filed: Apr. 4, 1994

[51] Int. Cl.$^6$ .............................. A23L 1/18; A23L 1/164; A23B 9/14
[52] U.S. Cl. .......................... 426/302; 426/305; 99/323.9
[58] Field of Search ................................. 426/302, 305; 99/323.9

[56] References Cited

U.S. PATENT DOCUMENTS

| | | |
|---|---|---|
| 4,089,984 | 5/1978 | Gilbertson . |
| 4,658,708 | 4/1987 | Rastoin . |
| 4,702,925 | 10/1987 | Verrico . |
| 4,856,453 | 8/1989 | Verrico . |
| 5,005,514 | 4/1991 | Verrico . |

*Primary Examiner*—Donald E. Czaja
*Assistant Examiner*—Choon P. Koh
*Attorney, Agent, or Firm*—Felfe & Lynch

[57] ABSTRACT

Disclosed is a process for producing a sweetener coating on a food product. A superheated pressurized solution of the sweetener is sprayed on a heated food product to form a coating thereon.

32 Claims, 1 Drawing Sheet

NO DRY COATING PROCESS FOR SUGAR COATED FOOD PRODUCTS

BACKGROUND OF THE INVENTION

The present invention is in a dry coating process and apparatus therefor and more specifically in a foodstuff coating process which omits intermediate or pre-coating cooling procedures and apparatus and significantly reduces the processing time for applying a topical coating, such as a sweetener coating, to a foodstuff product. The coating process and apparatus is especially useful in forming topical coatings on food products such as cereal products and the like.

Today's consumer is offered a large number of food products which have been prepared and/or treated in numerous ways for considerations such as convenience, appearance, storage stability and, most importantly for organoleptic considerations such as taste or feel during mastication. Presweetened food products such as cereals, cookies, pastries, snack foods, nuts or roasted nuts and candies have long been available. Such products often have surface sweetening which can have different appearances, i.e., glazed, frosted or powdered.

Topical or surface sweetening of a foodstuff is usually applied in the form of a solution of the sweetener. The sweetener can be a natural sweetener, such as a sugar, or it may be an artificial sweetening product such as potassium acesulfame or Aspartame, 3-amino-N-(α-carboxyphenethyl) succinamic acid N-methyl ester. Sugar, usually sucrose, is the primary ingredient of the sweetener. Other commonly used sugars include, i.e., dextrose, glucose, fructose, corn syrup, saccharin and other well known natural (honey) and artificial sweetening agents.

However, the application of surface sweetening to a foodstuff requires a number of different processing steps each of which necessitates a further treatment of the food product and capital and labor expenditures for additional apparatus, control systems and their maintenance. Each process step or operation introduces a potential bottleneck in the process should the apparatus or control systems break down during operation. Each step also is a possible source of off-spec product should that part of the system fail to operate properly. Since it is of the utmost importance to food producers to maintain a constant quality of product including taste, smell and appearance, it is highly desirable to eliminate, or minimize the possibilities for off-spec product.

The coating process also has an economic impact and can entail an expensive series of steps in the production of any given product. Thus, there are many good reasons, including process and quality control, to utilize as few processing steps as possible when trying to consistently produce a product according to technical specifications and subjective criteria.

SUMMARY OF THE INVENTION

The present invention is in a coating process which allows for control of parameters for crystal formation thus enabling the manufacturer to select the coating appearance. The process of the invention eliminates the need for the pre-coating cooling of the hot product, the attendant apparatus, the energy consumption associated with such steps and with operating such apparatus and the associated mechanical difficulties.

The process of the invention eliminates the intermediate processing and advantageously uses the existing energy of the product in combination with a conditioning of the sweetener solution. The inventive process reduces the number of treating cycles of the product and significantly reduces the processing time to coat the product and render it suitable for storage or packaging.

The process of the invention may also be conducted so as to eliminate a separate post-coating drying apparatus and the operation thereof.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
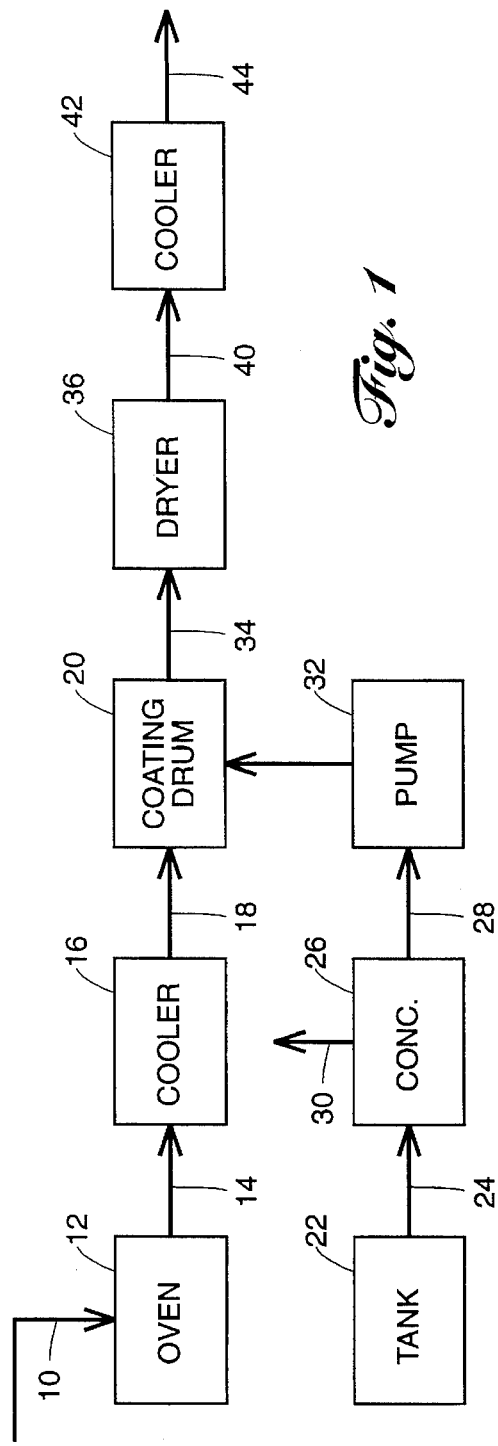
FIG. 1 schematically depicts a typical prior art process flow sheet in block diagram form for applying a sugar coating to a foodstuff.

FIG. 1 generally depicts a typical prior art sugar coating operation for a cereal. The cereal may be rice, wheat, psyllium, oat, barley, sorghum, corn, brans, or any mixture of cereal grains or ingredients and may be in any form such as flakes, shreds, biscuits, loops, nuggets, puffs or any other suitable form. The cereal 10 is introduced into an oven 12, which may be a multi-zone oven, wherein the cereal is toasted at temperatures of about 550°–680° F. and leaves the oven at a temperature of about 300° to 350° F. The toasted product 14 leaving oven 12 has a relatively low moisture content, i.e. 2–4%. The product is then transported to a cooler where the product is cooled to a temperature of less than 100° F. The cooled product has a lower energy level but a higher moisture content. The cooled product 18 is then introduced into a conventional coating drum 20.

Bulk holding tank 22 stores a sugar-water sweetener solution having a concentration of approximately 67 wt.-% sweetener. The solution is introduced into the concentrator 26 where, by the addition of heat, water is evaporated as vapor 30, and the concentration of the sweetening solution 24 is increased to form a syrup 28 having a sugar concentration corresponding to about 82 Brix. The syrup 28 leaves concentrator 26 at a temperature of about 228° to 232° F. and at essentially atmospheric pressure. Syrup 28 is then transported via pump 32 to a coating drum 20 wherein the cooled product 18 is coated with the syrup. Due to the coating of the product, the moisture content of the foodstuff is again increased. The coated product 34 which is still at approximately 100° F. is then fed to a dryer 36, where the coated product is heated by the addition of thermal energy, vapor 38 is driven off and the coating is dried. The heated dry product 40 is at a temperature of approximately 220° F. and is then transferred to a cooler 42 where it is cooled to a temperature of less than 100° F.

Thus it will be seen that the conventional prior art process utilizes no less than 4 (not including intermediate transfer operations) separate operations on the cereal after toasting, i.e. a first cooling, coating, drying and a second cooling for processing the food product to form a presweetened cereal for storage or packaging. In the prior art process, the foodstuff is subjected to cyclical increases and decreases of moisture content as well as the addition of, and removal of, energy. The thermal or energy history of the food product over the period between removal from the oven and packaging of the product has a multi-cyclic saw tooth profile. Typical processing times for the above described system from the discharge from the oven to readiness for packaging or storage range from about 700 to 5000 seconds with an average period being about 900 seconds.

Figure 2:
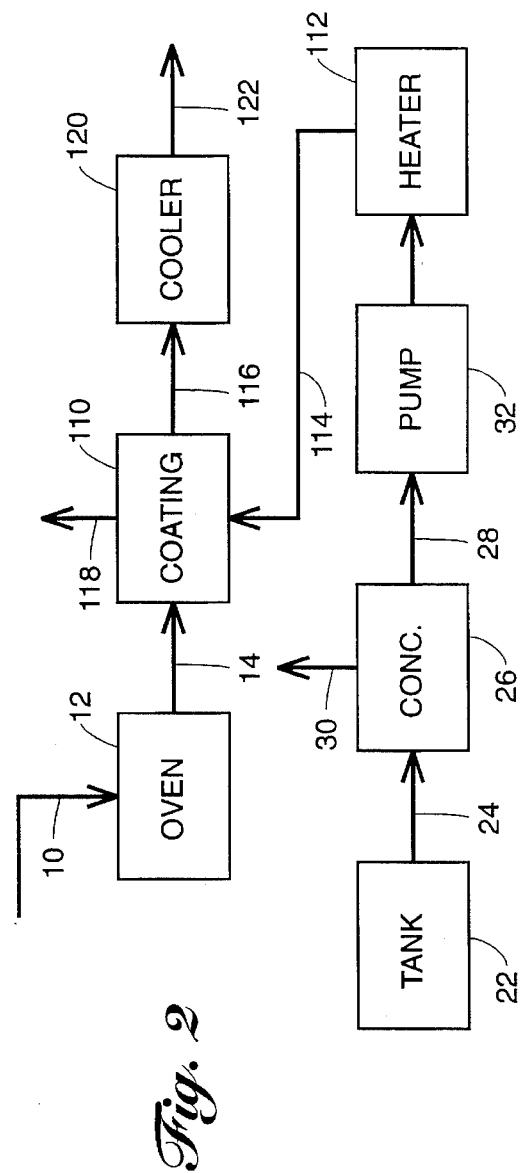
FIG. 2 schematically depicts in block diagram form a flow sheet for a preferred embodiment of the process of the invention.

FIG. 2 is a schematic in flow diagram form illustrating a preferred embodiment of the invention. For simplicity, the following description of the process of the invention will be for production of a presweetened cereal product.

The present invention takes advantage of the fact that the rate of crystallization is a function of the rate of nucleation and crystal growth and that crystal formation from a solution can be influenced or controlled by the solute to solvent ratio, the amount of available energy and the presence of nucleation sites. The size, shape and number of predominating crystals can thus be controlled with the result that the quality and appearance of the coating can be controlled. Balancing of the variables allows for the production of coatings with unique appearances.

The appearance of the coating on the food product is largely determined by the degree of crystallinity and crystal size distribution of the sweetening agent in the coating. If the sweetener in the coating, i.e., sugar is present as small crystals (50–100 μm), the coating has a frosted appearance on the food product. If the sugar is largely non-crystalline or is composed of predominantly large crystals (>200 μm in size), the resulting coating has a glazed appearance.

Crystallization is a two-step process. In the first step, known as nucleation, the nuclei are formed. When there is available solute, i.e., sucrose, the second step, crystal growth occurs. The average size of the crystals is inversely related to the number of nuclei present. When only a few nuclei are formed, relatively large (>200 μm) crystals form and the resulting coating has a glazed appearance. When a large number of nuclei are present, a large number of small crystals (50–100 μm) form and the resulting coating has a frost appearance. If too many nuclei are formed, the available solute, i.e., sucrose is greatly reduced and the crystals, still less than 1 μm in size, do not grow. This results in the formation of aggregates or clusters that can give a powdered sugar appearance to the coating. Thus, by controlling the number of nuclei and amount of solute and solvent present, one can largely control the appearance of the resulting coating because the predominant number of crystals is what gives the coating its appearance. For instance if the crystals are predominantly large and of the type that give a glaze appearance, the coating will have that appearance despite the presence of some smaller crystals.

It has been found that a more concentrated solution can be obtained and maintained by altering the conditions of the sweetener solution. In the process of the invention, the sweetener solution is superheated under pressure. Such a step enables one to increase the energy content of solids in solution, if desired, and to maintain the solute/solvent ratio providing favorable nucleation conditions without changing the physical or chemical properties of the solution. It will be understood that as used herein superheating is an addition of thermal energy to the syrup beyond that needed to heat the solution to its boiling point or boiling range in the liquid state at essentially the normal atmospheric pressure of the location. The syrup to be superheated is at, or substantially at, its desired concentration and the additional enthalpy does not, under the pressure condition, result in any substantial change of the solids concentration. If desired, one could use higher concentration sugar solutions than would be possible in conventional techniques, such as that of FIG. 1, since the use of pressurized superheating allows one to use high concentration solutions which, under pressure, maintain solution attributes.

One advantage of the process is that the energy of the superheat can be beneficially used. This is in part because the mass flow rate of the sweetener solution is generally less than the mass flow rate of the foodstuff to be sweetened, i.e. approximately 0.05–0.75 pound sweetener solution per pound of foodstuff.

In the process of the invention, the step of cooling the product from the oven prior to coating the product is omitted. The product is coated in a hot or warm condition and, in combination with the conditioning of the solution, results in obtaining a dry coating without a separate drying step. Another advantage is that the concentrated solutions do not undergo rheological changes which would make their handling characteristics difficult or unpredictable. For instance, while commercially available concentrations of the sweetener corn syrup are generally considered newtonian fluids, higher concentrations often display non-newtonian characteristics and high concentrations of sucrose in water results in mixtures that display the characteristics of a glass.

It has been found that the nuclei formation can most favorably be influenced during the syrup application step and that certain composition modifications can enhance or retard nucleation. In the invention, when using a pure sucrose-water system, a large number of nuclei form resulting in a coating having a powdered sugar look. The addition of a small amount of high fructose corn syrup (HFCS), i.e. 1 to 10 wt.-% and preferably 2–4 wt.-%, can slightly retard nucleation resulting in slightly larger crystals (50–100 μm) and a frost appearance.

It has also been found that the amount of superheat added to the pressurized solution influences the resulting coating appearance. Increased amounts of superheat, i.e. temperatures of approximately 230° to 290° F. tend to form more crystalline coatings with a frost appearance while lesser amounts of superheat, i.e. up to a temperature of about 230° F., tend to give a glazed coating appearance.

Adjusting the sweetener solution composition by adding an invert sugar such as high fructose corn syrup or honey, can give the coating a frosted sugar appearance when the syrup is superheated to a temperature of 230° to 290° F. At temperatures above 290° F., the appearance of the coating can be controlled by adjusting the amount of the high fructose corn syrup with higher amounts being used at higher temperatures to obtain the frost or glazed sugar appearance.

Referring to FIG. 2, cereal 10 is introduced into oven 12 wherein it is toasted to produce a toasted product 14 at a temperature of approximately 300° to 350° F. The oven 12 is a multi-zone oven operated at temperatures in the range of about 550° to 680° F. The toasted product 14 leaving oven 12 is at an elevated temperature and has a relatively low moisture content.

The hot toasted product from oven 12 may experience some cooling and/or moisture loss while being transferred to a coating apparatus 110. The amount of heat loss will be a function of many variables including the ambient conditions at the location. The heat loss is preferably minimized but some heat loss is unavoidable unless supplementary heat is added. Thus, the exclusion of intermediate or pre-coating cooling does not refer to such heat losses from the product. Preferably the temperature of the product when it is introduced into coating apparatus 110 is no less than about 225°–275° F. when the coating apparatus 110 is being operated at approximately the normal atmospheric pressure of the location. If operated at less than the atmospheric pressure of the location, the product temperature can be lower. If apparatus 110 is operated above the standard atmospheric pressure of the location, the product temperature is preferably above 225° F. to enable the coating to dry.

Coating apparatus 110 may be of the conveyor type, such as a transit tube, or a fluidizing system such as a pneumatic conveying apparatus or a fluidized bed. Coating apparatus 110 is most preferably one wherein the mass of the food product is lifted and separated so that the individual food particles, rather than the foodstuff in a bulk mass form, are actually coated. The residence time of the food product in the coating apparatus can be from about 15 seconds to about a minute. Systems using air should use pre-filtered air to minimize contamination of the food product.

In a preferred embodiment, the coating apparatus 110 is a transit tube. A suitable transit tube is disclosed in U.S. Pat. No. 4,658,708, the disclosure of which is incorporated herein by reference. The transit tube contains a conveying mechanism, such as a pair of rotary screws, for transporting the food product along the trough of the tube and is adapted with brushes which convey, lift, and separate the food product thus exposing additional food product surface, and allowing improved moisture evaporation from the surface. The moisture is evacuated from the coating apparatus 110 under a slight vacuum, i.e., generally no more than about 10 inches wg.

Bulk holding tank 22 contains a sweetener solution (sugar-water) 24 which is transferred to a concentrator 26 wherein by driving off water as vapor 30 a syrup 28 of approximately 82 Brix concentration is formed. Of course, if the sweetener solution is already at the desired solids concentration, the concentrator step is not necessary. If a frosted coating appearance is desired, a very small amount of HFCS is added to the sucrose-water solution in the holding tank. Where a powdered sugar look is desired, the HFCS is omitted.

Positive displacement pump 32 increases the pressure of syrup 28 to 40 to 200 psig for introduction into a heater 112 wherein the pressurized syrup is superheated to a temperature of up to 450° F. and, preferably up to about 290° F. and most preferably to a temperature in the range of 260° to 290° F. The pressurized superheating maintains the water content of the heated syrup thus maintaining the pre-selected solids concentration or solute/solvent ratio while raising the solution energy content.

In a preferred embodiment, the coating apparatus 110 has a feed inlet and a product outlet and is formed of an elongated section preferably formed from two horizontally oriented overlapping sections which are semicircular or are formed so as to envelop over more than half of the periphery of each respective rotary screw.

In operation, the oven discharge product 14 is conveyed along the length of the coating apparatus 110. The use of variable speed systems or other transmission devices enables one to adjust for capacity or processing time. Within the apparatus 110, shafts and thus the brushes, rotate in an opposed manner and move the product along the length of the tube while simultaneously lifting and separating or fluffing the food product.

The heated and pressurized syrup 114 is introduced into coating apparatus 110 to coat the toasted cereal 14. The environment within coating apparatus 110 will generally be approximately at about atmospheric pressure but in any event will be at a pressure condition less than that of the pressurized superheated syrup. In apparatus 110, the syrup is sprayed onto the conveyed food product to form a hot coated cereal product 116 which leaves apparatus 110 at a temperature of about 200° F. The spray is generated by passing the syrup through spray heads which cause pressure loss thus contributing to the evaporation of moisture from the syrup. The removal of moisture by flash evaporation effectively increases the concentration of the solute in the droplets. The evaporative cooling effect and increased ratio of solute/solvent result in a syrup condition where, according to the phase diagram of the sucrose-water system, crystal formation commences. Evaporation of moisture in coating apparatus 110 produces a vapor stream 118. Because the product is coated almost immediately after leaving the oven and there is no intermediate pre-coating cooling step, the thermal energy contained in the hot product helps to dry the coating.

The vaporized moisture within apparatus 110 is removed under slight vacuum through an exhaust port. The coated product is discharged from tube 110 and is fed into cooler 120 for cooling to a temperature below about 110° F. The cooled product is then ready for packaging or storage. In summer months, a dehumidification unit may be added to the cooler to control the moisture content of the product.

In the process of the invention, the average processing time from oven discharge to packaging or storage ranges from about 80 to 120 seconds with about 90 seconds being the average.

It has been found that the spraying step has an influence on the resulting topical coating. Decreased droplet size and increased droplet fall time have a beneficial effect on crystallization. This is surprising since the conventional wisdom is that conditions are better for nucleation in larger volumes of solution.

In the process of the invention the elevation of the spray above the conveyed food product in the coating device can be varied according to the desired coating appearance. Longer drop times are obtained by increased elevation of the spray nozzle above the food product and result in smaller droplets of the solution.

In apparatus 110, a spray header extends for at least a portion of the tube length and is elevated with respect to the bulk of the conveyed food product. The spray header extends substantially parallel to the longitudinal axes of apparatus 110 and is equipped with at least one, and preferably a plurality of, spray heads. The hot pressurized syrup is fed into the header and forced through the spray nozzles to generate a spray which is then atomized by compressed air. The atomized spray droplets fall and coat the lifted foodstuff particles.

The spray nozzles are at an elevation and of a design so as to provide a dispersion angle which enables the sprayed sweetener solution to coat particles over the cross section of the apparatus 110. However, the elevation of the spray with respect to the bulk of the food stuff must be sufficient to allow a proper drop period so as to evaporate the moisture of the concentrated pressurized sweetener solution. In a preferred embodiment the elevation of the spray nozzle or assembly is from about 10 to 20 inches above the bulk of the food mass.

It has also been found that the use of a compressed gas stream to atomize the sprayed solution when the solution has been sprayed provides an additional degree of control of crystallization and the coating appearance. Improved crystallization results from the use of higher pressure gas. If no compressed gas, low pressure compressed gas or an insufficient amount of compressed gas is utilized, the resulting coating tends to have a glazed appearance or an appearance similar to that of a glazed coating while higher pressure or higher gas flow rates tend to give a powdered sugar appearance. Preferably the sprayed or atomized droplets are not larger than about 0.1 inches and are most preferably of smaller dimension down to about 0.001 inches. However, the sprayed solution should not be atomized such that a significant amount of the droplets are entrained by air currents and are independently or separately conveyed out of the coating apparatus 110.

In a preferred embodiment, the sprayed sweetener is subjected to external atomization. That is to say that the spray is atomized when discharged from the spray nozzle by the use of compressed gas, preferably clean, food grade quality air. The compressed air is at a pressure of 40 to 60 psig and is at a rate of approximately 0.2 to 0.4, and preferably about 0.3, standard cubic feet per pound of sweetener solution. The compressed air can be at room temperature but in a preferred embodiment is heated. In a most preferred embodiment, the compressed gas is air and is heated to a temperature in the range of about 150° to about 250° F.

The spray nozzle arrangement may be part of a spray gun assembly. Suitable spraying nozzles for external mixing and assemblies with control are available from Spray Systems Co. of Wheaton, Ill. The external application of compressed air can also be accomplished with a double nozzle system where the compressed air stream emanates from a separate but adjacent nozzle oriented so as to shatter the spray droplets as they pass out of the syrup spray nozzle.

Optionally, the apparatus 110 may be formed with a heating jacket. This construction allows the apparatus to be warmed to assist in removing any accumulation from the walls during scheduled or unscheduled outages. While the coating apparatus is preferably operated without the addition of heat beyond that contained in the food product, the syrup or compressed gas, heat to assist in drying the coating may be added through the heating jacket and/or by the introduction of heated air into the transit tube. However, such an embodiment compromises advantageous aspects of the invention and will not enable one to realize the full energy savings obtainable by practicing the invention in accordance with the preferred embodiment.

In the process of the invention the food product is subjected to reduced processing. Only 2 (excluding intermediate transport) process operations are performed on the product after toasting, i.e. coating and cooling. Additionally, the processing period of the product from its removal from the oven is significantly reduced without sacrifice of product quality or organoleptic attributes.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A process for producing a surface coating on a food stuff comprising:

provi ding a hot food product providing a coating solution of a desired concentration and moisture content;

pressurizing the coating solution;

superheating the pressurized coating solution while essentially maintaining the solution moisture content;

spraying the superheated concentrated solution of the coating onto the surface of the food product to form a coated food product.

2. The process of claim 1 wherein without intermediate cooling of the hot food product, the superheated solution of the coating is sprayed onto the food product.

3. The process of claim 1 further comprising cooling the coated food product.

4. The process of claim 1 wherein the spraying is through a spray means and the spray solution is atomized externally of the spray means.

5. The process of claim 4 wherein the sprayed solution is atomized by a compressed gas.

6. The process of claim 5 wherein the compressed gas is air.

7. The process of claim 6 wherein the compressed air is at a pressure of 40 to 60 psig.

8. The process of claim 5 wherein the gas is heated.

9. The process of claim 6 wherein the air is heated.

10. The process of claim 1 wherein the coating is a sweetener.

11. The process of claim 10 wherein the sweetener comprises at least one of sucrose, glucose, dextrose, corn syrup, fructose, honey or an artificial sweetener.

12. The process of claim 1 wherein the food product is a cereal, snack food or pastry.

13. The process of claim 1 wherein the superheated solution is at a pressure of 40 to 200 psig.

14. The process of claim 4 wherein the atomized solution droplets are of a dimension of about 0.001 to about 0.1 inches.

15. The process of claim 1 wherein the food product is lifted and separated during the coating process.

16. The process of claim 10 wherein the sweetener is a sucrose-water solution and optionally contains HFCS.

17. The process of claim 5 wherein at least one of the compressed gas pressure, compressed gas volume, the solution concentration, or the degree of superheat is controlled.

18. The process of claim 1 wherein the sweetener solution is concentrated prior to its being superheated.

19. A method of controlling crystal formation in a sweetener coating process comprising:

providing an aqueous solution of the sweetener;

pressurizing the aqueous solution while essentially controlling the sweetener solution moisture content; and spraying the pressurized aqueous solution onto a surface whereby the sprayed solution is subjected to evaporative cooling during deposition of the sprayed solution onto the surface.

20. The method of claim 19 wherein the sprayed aqueous solution is atomized.

21. The method of claim 19 wherein the sprayed aqueous solution is atomized by a compressed gas.

22. The method of claim 21 wherein the compressed gas is air.

23. The method of claim 21 wherein the compressed gas is at a pressure of about 40 to 60 psig.

24. The method of claim 21 wherein the gas is heated.

25. The method of claim 22 wherein the air is heated.

26. The method of claim 19 wherein the sweetener is at least one of sucrose, fructose, corn syrup, glucose, dextrose, honey or an artificial sweetener.

27. The method of claim 19 wherein the sweetener is sucrose and HFCS is optionally added to the aqueous solution.

28. The method of claim 19 wherein the surface is that of a food product.

29. The method of claim 19 wherein at least one of the compressed gas pressure, compressed gas volume, the solution concentration or the degree of superheat is controlled.

30. A food product having a surface coating formed thereon by the process of claim 1.

31. A food product having a sweetener coating formed thereon by the process of claim 19.

32. A process for producing a surface coating on a food stuff comprising:

provinding a coating solution of a desired concentration and moisture content;

pressurizing the coating solution;

superheating the pressurized coating solution while essentially maintaining the solution moisture content; and introducing a hot food product into an environment wherein the pressure is below that of the pressurized coating solution;

spraying the superheated concentrated solution of the coating into the environment so as to form a coating on the surface of the food product.

* * * * *